US007109993B2

(12) United States Patent
Peleg et al.

(10) Patent No.: US 7,109,993 B2
(45) Date of Patent: Sep. 19, 2006

(54) METHOD AND SYSTEM FOR THE AUTOMATIC COMPUTERIZED AUDIO VISUAL DUBBING OF MOVIES

(75) Inventors: Shmuel Peleg, Jerusalem (IL); Ran Cohen, Petach Tikva (IL); David Avnir, Jerusalem (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 472 days.

(21) Appl. No.: 10/279,097

(22) Filed: Oct. 24, 2002

(65) Prior Publication Data
US 2003/0085901 A1    May 8, 2003

Related U.S. Application Data

(63) Continuation-in-part of application No. 09/051,417, filed on Jul. 15, 1998, now Pat. No. 6,492,990.

(30) Foreign Application Priority Data
Oct. 8, 1995    (IL) .................................... 115552

(51) Int. Cl.
*G06T 15/00*    (2006.01)
(52) U.S. Cl. ..................... 345/473; 345/419; 345/949
(58) Field of Classification Search .................. 352/5, 352/12, 23, 25; 345/419, 630, 473, 474, 345/475, 949, 957; 375/88.13, 13, 88; 353/19
See application file for complete search history.

(56) References Cited

U.S. PATENT DOCUMENTS

| 4,260,229 A | 4/1981 | Bloomstein | 352/50 |
|---|---|---|---|
| 4,569,026 A | 2/1986 | Best | 715/716 |
| 4,600,281 A | 7/1986 | Bloomstein | 352/50 |
| 4,827,532 A | 5/1989 | Bloomstein | 382/100 |
| 4,884,972 A | 12/1989 | Gasper | 434/185 |
| 5,111,409 A | 5/1992 | Matthews, III et al. | 715/500.1 |
| 5,557,724 A | 9/1996 | Sampat et al. | 725/43 |
| 5,623,587 A * | 4/1997 | Bulman | 345/630 |
| 5,926,575 A | 7/1999 | Ohzeki et al. | 382/243 |

(Continued)

FOREIGN PATENT DOCUMENTS

EP        179 701        4/1986

(Continued)

OTHER PUBLICATIONS

Lavagetto et al., "Object-oriented scene modeling for interpersonal video communication at very low bit rate", May 4, 1993, Elsevier Signal Processing: Image Communication 6, pp. 379-395.*

(Continued)

*Primary Examiner*—Phu K. Nguyen
(74) *Attorney, Agent, or Firm*—Lowe Hauptman & Berner, LLP

(57) ABSTRACT

A method for automated computerized audio visual dubbing of a movie comprises (i) generating a three-dimensional head model of an actor in a movie, the head model being representative of specific facial features of the actor, and (ii) generating a three-dimensional head model of a dubber making target sounds for the actor, the dubber head model being representative of specific facial features of the dubber, as the target sounds are made. The method also comprises modifying at least a portion of the specific facial features of the actor head model according to the dubber head model such that the actor appears to be producing target sounds made by the dubber.

28 Claims, 4 Drawing Sheets

U.S. PATENT DOCUMENTS 6,054,999 A    4/2000   Strandberg .................. 345/474

FOREIGN PATENT DOCUMENTS

EP          674 315        9/1995

OTHER PUBLICATIONS

Brand, Voice Puppetry, SIGBRAPH 99, ACM, Sep. 1999, pp. 21-28.*

Breton et al., FaceEngine A 3D Facial Animation Engine for Real Time Applications, ACM, WEB3D'2001; Mar. 2001, pp. 15-22.*

Morishima, S. et al. "An Intelligent Facial Image Coding Driven by Speech and Phoneme." May 1989, pp. 1795-1798.

Li, H. et al. "3-D Motion Estimation in Model-Based Facial Image Coding," Jun. 1993, pp. 545-555.

Choi, C. S., et al. "Analysis and Synthesis of Facial Expressions in Knowledge-Based Coding of Facial Image Sequences." 1991, pp. 2737-2740.

Morishima et al., Facial Expression Synthesis Based on Natural Voice for Virtual Face-to-Face Communication with Machine, Sep. 1993, pp. 486-491.

Platt et al., Animating Facial Expressions, Aug. 1981, pp. 247, 249-250.

Nakagawa et al., An Experimental PC-based Media Conversion System, Aug. 1993, pp. 141-142.

* cited by examiner

METHOD AND SYSTEM FOR THE AUTOMATIC COMPUTERIZED AUDIO VISUAL DUBBING OF MOVIES

This application is a continuation-in-part of application Ser. No. 09/051,417, filed Jul. 15, 1998, now U.S. Pat. No. 6,492,990.

Portions of this application are contained on compact disc(s) the contents of which are entirely incorporated herein by reference. The compact discs are labeled as Copy 1 and Copy 2, respectively. The compact discs are identical and each includes the following ASCII files:

| File Name | File Size | Creation Date |
|---|---|---|
| dub.c | 27937 | Nov. 4, 2001 3:47 pm |
| general.c | 26904 | Nov. 4, 2001 3:47 pm |
| gimg.h | 2518 | Nov. 4, 2001 3:47 pm |
| io.c | 1299 | Nov. 4, 2001 3:47 pm |
| list.h | 1941 | Nov. 4, 2001 3:47 pm |
| mv.h | 4470 | Nov. 4, 2001 3:47 pm |
| texture.c | 2984 | Nov. 4, 2001 3:47 pm |

FIELD OF THE INVENTION

The present invention relates to a method for automatic audio visual dubbing of movies. More specifically the said invention relates to an efficient computerized automatic method for audio visual dubbing of movies by computerized image copying of the characteristic features of the lips movements and other facial features of the dubber onto the mouth area of the original speaker.

The invention overcomes the well known disadvantage of the correlation problems between lip movement in the original movie and the sound track of the dubbed movie.

DEFINITIONS OF TERMS RELATED TO THE INVENTION

Firstly, there are provided some definitions of important key words employed in this specification.

Actor (the original actor)—an actor, speaker, singer, animated character, animal, an object in a movie, or a subject in a still photograph; any human, animal, or other entity speaking or made to appear to speak at least one target sound.

Audio Visual Dubbing—Manipulating, in one or more frames, specific facial features (specifically those of the mouth area) of the actor so that it will be similar as much as possible to that of the dubber in the reference frame.

Correlation Function—A function describing the similarity of two image regions. The higher the correlation, the better is the match.

Dubber—The person or persons, who speak/narrate/sing/interpret the target text. The dubber can be the same as the actor. The dubber can be a human, animal, or any other entity speaking or made to appear to speak at least one target sound.

Dubbing—Replacing part or all of one or more of the original sound tracks of a movie, with its original text or sounds (including the case of the silent track of a still photograph), by another sound track containing the target text and/or sound.

Edge Detector—A known image processing technique used to extract boundaries between image regions which differ in intensity and/or color.

Face Parametrization—A method that numerically describes the structure, location, and expression of the face.

Head Model—A three-dimensional wire frame model of the face that is controlled by numerous parameters that describe the exact expression produced by the model (i.e. smile, mouth width, jaw opening, etc.).

Movie (the original movie)—Any motion picture (e.g. cinematic feature film, advertisement, television show, video, animated cartoon, still video picture, etc.). A sequence of consecutive pictures (also called frames) photographed in succession by a camera or created by an animator. In the case of the movie being a still photograph, all of the consecutive pictures are identical to each other. When shown in rapid succession an illusion of natural motion is obtained, except for the case of still pictures. A sound-track is associated with most movies, which contains speech, music, and/or sounds, and which is synchronized with the pictures, and in particular where the speech is synchronized with the lip movements of the actors in the pictures. Movies are realized in several techniques. Common methods are: (a) recording on film, (b) recording in analog electronic form ("video"), (c) recording in digital electronic form, (d) recording on chips, magnetic tape, magnetic disks, or optical disks, and (e) read/write by magnetic and/or optical laser devices. Finally, in our context, an "original movie" is also an audio-visual movie altered by the present invention, which serves as a base for further alterations.

Original Text—A text spoken or sung by the actor when the movie is being made, and which is recorded on its sound track. The text may be narrated in the background without showing the speaker, or by showing a still photograph of the speaker.

Pixel—Picture element. A digital picture is composed of an array of points, called pixels. Each pixel encodes the numerical values of the intensity and of the color at the corresponding picture point.

Reference Similarity Frame—A picture (being a frame in the original movie, a frame in any other movie, or a still photograph) in which the original actor has the desired features of the mouth-shape and head posture suitable for the audio visually dubbed movie.

Target Text or Target Sound(s)—A new vocal text or sound, to replace the original vocal text or sound of the actor. The target text or sound may also be that which is to be assigned to an actor who was silent in the original movie. The new text can be in another language, to which one refers as DUBBING. However, this invention relates also to replacement of text or sound without changing the language, with the original actor or with a dubber in that same language. The target text may have the same meaning as the original text, but may have also a modified, opposite, or completely different meaning. According to one of many applications of the present invention, the latter is employed for creation of new movies with the same actor, without his/her/its active participation. Also included is new vocal text or sound used to replace the null vocal text attached to one or more still photographs.

Texture Mapping—A well known technique in computer graphics which maps texture onto a three-dimensional wire frame model.

Two-Dimensional Projection—The result of the rendering of the three-dimensional face model onto a two-dimensional device like a monitor, a screen, or photographic film.

BACKGROUND OF THE INVENTION

Movies are often played to an audience that is not familiar with the original language, and thus cannot understand the sound track of such movies. Two well known common approaches exist to solve this problem. In one approach sub-titles in typed text of the described language are added to the pictures, and the viewers are expected to hear the text in a foreign language and simultaneously to read its translation on the picture itself. Such reading distracts the viewers from the pictures and from the movie in general. Another approach is dubbing, where the original sound-track with the original text is being replaced by another sound-track with the desired language. In this case there is a disturbing mis-match between the sound-track and the movements of the mouth.

There have been some earlier attempts to overcome these disadvantages, none of which have been commercialized because of inherent principal difficulties which made the practical execution unrealistic. Thus, in U.S. Pat. No. 4,600,281 a method is described which performs the measurements of the shape of the mouth manually by a ruler or with a cursor, and corrects the mouth shape by moving pixels within each frame. As will be seen in the description of the invention, the method according to the present invention is inherently different and much superior in the following points: In the present invention the tracking of the shape of the mouth is done automatically and not manually. In the present invention changing the shape of the mouth is done by using a three-dimensional head model, for example like those described by P. Ekman and W. V. Friesen, (Manual for the Facial Action Unit System, Consulting Psychologist Press, Palo Alto 1977). In the present invention the mouth area of the actor is replaced using the mouth area of a reference similarity frame. In the present invention mouth status parameters of the dubber are substituted for mouth status parameters of the actor.

The U.S. Pat. No. 4,260,229 relates to a method of graphically creating lip images. This U.S. patent is totally different from the present invention: In the U.S. patent, speech sounds are analyzed and digitally encoded. In the present invention no sound analysis is done; nor is any required at all.

To make for better viewing of the audio visually dubbed movie, the present invention provides a computerized method wherein, in addition to replacing the sound track to the target text, the mouth movements of the actor are being automatically changed to match the target text. The new mouth movements are linguisty accurate and visually natural looking according to all of the observable parameters of the actor's face.

SUMMARY OF THE INVENTION

The present invention relates to a method for automated computerized audio visual dubbing of a movie, comprising:

(a) generating a three-dimensional head model of an actor in a movie for at least one frame in said movie, wherein said actor head model is representative of specific facial features of said actor in said frame;

(b) generating a three-dimensional head model of a dubber making target sounds for said at least one frame in said movie, wherein said dubber head model is representative of specific facial features of said dubber, as said target sounds are made; and (c) modifying at least a portion of said specific facial features of said actor head model according to said dubber head model such that said actor appears to be producing said target sounds made by said dubber.

It is appreciated that the facial features that are represented in the head model of the dubber need not correspond to those facial features represented in the head model of the actor, though preferably they are the same. It is further appreciated that the head model provides a representation (for the actor and the dubber, respectively) of specific facial features and how they change through the frame that is being dubbed.

According to preferred embodiments of the present invention, the method further comprises the step of modifying the face of the actor in the frame according to the actor head model as modified in step (c) so as to obtain a frame wherein at least a portion of the specific facial features (and their movements throughout the frame) of the actor are substantially identical to the corresponding specific facial features of the dubber. The method preferably also comprises replacing target sounds made by the actor with target sounds made by the dubber.

Further according to preferred embodiments of the present invention, the specific facial features comprise the lips and mouth area. It is appreciated that the lips and mouth area are of key importance when dubbing is carried out, since this is the area where discrepancies between the movement of the speaker's face (specifically the lips) and the words are most noticed.

Still further according to preferred embodiments of the present invention, the specific facial features further comprise any other secondary facial muscles, for example, the cheeks and the eyebrows.

Single frames, multiple frames, or a complete movie may be dubbed in accordance with the invention. The movie may be a photographed movie, an animated movie, or any combination thereof.

Additionally according to preferred embodiments of the present invention, steps (a) and (b) of generating the three-dimensional head models are accomplished by computer fitting a generic three-dimensional head model to the actor or dubber's picture using significant facial features of said actor or dubber.

Moreover according to preferred embodiments of the present invention, the method also comprises computer tracking specific facial features of said three-dimensional head model of the actor or the dubber through a plurality of frames in the movie so as to create a library of reference similarity frames.

Further according to preferred embodiments of the present invention, the method further comprises mapping, for a plurality of frames in the movie, the face of the actor to the three dimensional head model of the actor. The mapping preferably employs a computerized texture mapping technique that uses the reference similarity frames.

Still further according to preferred embodiments of the present invention, the step of modifying at least a portion of the three-dimensional head model of the actor comprises replacing, on a frame by frame basis, at least a portion of the specific facial features of the actor head model with those of the dubber head model.

Additionally according to preferred embodiments of the present invention, the actor is a human, an animal, or any object made to appear to be speaking.

Moreover according to preferred embodiments of the present invention, the dubber is a human, an animal, or any object made to appear to be speaking.

Further according to preferred embodiments of the present invention, the target sounds comprise at least one spoken word, or at least one sound.

The present invention also relates to a method for automated computerized audio visual dubbing of a movie, comprising:

(a) providing a three-dimensional graphical model of a head;

(b) providing a video sequence of a speaker having at least one frame;

(c) tracking features of the speaker through the video sequence, and extracting changing head parameters of the speaker;

(d) applying the changing head parameters to the three-dimensional graphical head model so as to create a "speaking" three-dimensional head model; and (e) generating a video sequence having at least one frame of said speaking three-dimensional head model using computer graphic methods.

According to preferred embodiments of the present invention, the head parameters comprise parameters of the lips and mouth area. Preferably, the head parameters further comprise parameters of secondary facial muscles including the cheeks and the eyebrows. Thus, the three dimensional head model provides a representation of key head parameters of the speaker, and how said head parameters change while the speaker is speaking target sounds.

Further according to preferred embodiments of the present invention, the method also comprises the step of adding a sound track to the video sequence of the three-dimensional head model.

Further according to preferred embodiments of the present invention, the speaker is a human, an animal, or any object made to appear to be speaking.

The present invention also relates to a system for automated computerized audio visual dubbing of a movie, comprising:

(a) means for providing a three-dimensional graphical model of a head;

(b) means for tracking features of a speaker through a video sequence, and for extracting changing head parameters of the speaker through the video sequence;

(c) means for applying the changing head parameters to the three-dimensional graphical head model so as to create a "speaking" three-dimensional head model and for generating a video sequence of the speaking three-dimensional head model using computer graphic methods; and (d) means for adding a sound track to the video sequence of the three dimensional head model.

The present invention further relates to a system for automated computerized audio visual dubbing of a movie, comprising:

(a) means for generating a three-dimensional head model of an actor in a movie for at least one frame in the movie, wherein the actor head model is representative of specific facial features of the actor in the frame;

(b) means for generating a three-dimensional head model of a dubber making target sounds for said at least one frame in the movie, wherein the dubber head model is representative specific facial features of the dubber, as the target sounds are made; and (c) means for modifying at least a portion of said specific facial features of said actor head model according to said dubber head model such that said actor appears to be producing the target sounds made by the dubber.

It is appreciated that an actor in a given movie may be used as a dubber for another movie. Thus, a movie (or any number of frames of a movie) that has been or is to be dubbed can also serve as a source for target sounds for dubbing a second movie (or any number of frames in said second movie), using the method of the present invention.

The present invention uses a method of vicinity-searching, three-dimensional head modeling of the original speaker, and texture mapping techniques in order to produce the new images which correspond to the dubbed sound track. The present invention also relates to a system for employing said method. By using the three dimensional head model one can control the audio visual dubbing process even if the actor is moving his head. In most applications about 15 significant facial features on the face are used in the tracking stage, such as eye corners, mouth corners, and the nostrills. Only those facial features which are visible to the viewer (using the information available to the model) are tracked.

In the present invention, audio visual dubbing is normally used in conjunction with the use of audio dubbing; but one may also use it in conjunction with an audio track where no equivalent track exists in the original movie.

The method according to the present invention is useful for the audio visual dubbing of motion pictures such as cinematic feature films, advertisements, video, and animated cartoon. Also the audio visual dubbing of still photographs, wherein all of the frames of the movie are the same, is made possible by the present invention. For instance, still photographs are used for this type of movie in T.V. news programs where the reporter's voice is heard while a still photograph of him/her is shown.

Thus, according to the present invention even speechless actors, infants, animals, and inanimate objects can be audio visually dubbed to speak in any language.

According to our invention, the animation process saves much of the labor associated with the animation of the mouth area.

The present invention further provides a computer program (see Appendix 1) for operating the computerized audio visual dubbing.

The present invention further relates to the library of reference similarity frames

BRIEF DESCRIPTION OF THE DRAWINGS

The present invention will be further described by FIGS. 1–4. These figures are solely intended to illustrate the preferred embodiment of the invention and are not intended to limit the scope of the invention in any manner. Likewise, the appended computer program represents an example of the implementation of the method disclosed in the present patent and is not intended to limit the scope of the method in any way.

DETAILED DESCRIPTION OF THE INVENTION

Figure 1:
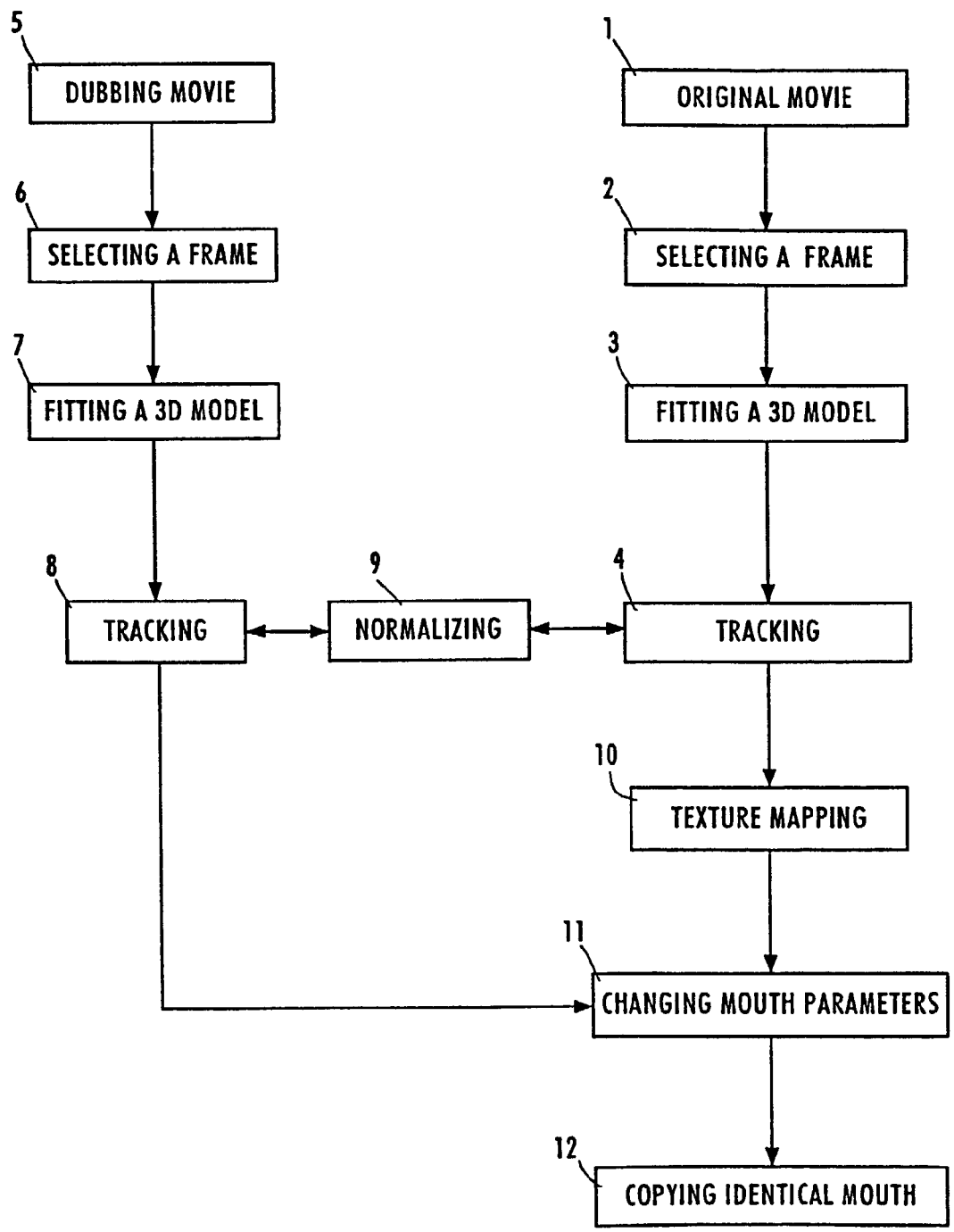
FIG. 1 illustrates a block diagram showing the method stages.

Given an original movie where an actor speaks the original text, a movie of a dubber is made where the dubber speaks the target text in either another language or the same language. The movie of the dubber is taken while the dubber performs a routine dubbing adaptation of the original into the target text.

This invention provides a method for the changing of the actor's facial motions in the original movie to create a new movie having the sound-track in the target text from the movie of the dubber, while the pictures are of the original movie, whereas the motion of the mouth of the actor is modified to correspond to the new sound-track.

For brevity considerations, the description of this invention uses pictures in electronic digital form (composed of an array of pixels), but movies in any other form are treatable as well. In these cases, the movie is translated to a digital form by existing techniques, manipulated in the digital form, and returned back to any desired form by known techniques.

A facial expression can be described by an "action unit", for example the Facial Action Coding System (FACS) by Ekman and Friesen (Ekman et. al.). Action units (AU) stands for a small change in the facial expression which depends on a conscious activation of muscles (H. Li, P. Roivainen, R. Forchheimer, 3-D Motion in Model-Based Facial Image Coding, IEEE Transactions in PAMI, 15 (2), 545–555 (1993)). The AU information is expressed in parameter form. Using the AU parameters, many facial expressions can be controlled. Parameters like face location and size, aspect-ratios of face regions, location of specific face features and many more.

As explained above, one of the stages of this invention is a three-dimensional parameterisation of the face. An example for one such model is the model of Parke (Fredric I. Parke, Parameterized Models for facial Animation, IEEE computer Graphics and Applications, 12 (11), 61–68, (1982)) which consists of about 25 parameters. Face parameters can be roughly divided into three main classes: structure parameters, location parameters, and expression parameters.

Structure parameters are fixed for every head and include distance ratios between the mouth and the eyes, the mouth and the chin, width of the model, jaw width, etc. The location parameters are, for example: three parameters for three-dimensional rotation in space and three parameters for three-dimensional translation (position in the real world). The expression parameters are, for instance: mouth width, smile (as an example, the parameter values here may be 0.0 for a very sad mouth and 1.0 for a very happy mouth), jaw opening, upper lip lifting, lower lip lowering, lip thickness, and so on.

Using a face model, the present invention is centered on a computer program (see Appendix 1), which automatically re-shapes the lip movements of the actor according to the lip movements of the dubber by searching for the nearest reference similarity frames. This computer program (software), or similar, is an integral and an important part of the present invention. The process, according to the present invention, is divided generally into the TRACKING phase and the NEW-MOVIE generation phase, as follows:

I. Tracking Phase

Step 1: The first step is personalizing the generic three-dimensional face model for both the actor and the dubber. In order to modify the generic face model to fit a specific face, some additional information is needed. The generic model has to be translated, scaled and stretched to fit the given actor's face, from its initial position and setting. This is done by manually pointing using a pointing device such as a mouth, a touch screen, etc., several facial features on the actor's face, e.g. eye corners, mouth corners, top and bottom of face. Typically a total of approximately 15 facial features are used, but this number may vary according to specifications. These facial features are marked on one (any) of the frames in the movie, in which the actor, preferably, faces the camera. The computer program then calculates automatically the exact model parameter's modifications needed for its two-dimensional projection to fit the actor face on the movie frame. In addition to using the facial features and in order to increase accuracy, the model is also adjusted to match the head edges, which are computed using an edge detector. If a side view of the actor is available it can be used to set several depth parameters, such as face depth and nose length. Otherwise, the face depth is scaled by some predetermined scale which is set experimentally.

Step 2: After the generic face model has been personalized to the desired actor, face features in several key frames in the movie are marked. The number of such frames can vary from a single first frame to about 5% of all frames, depending on the difficulty of the segment fitting the model to the actor using the marked facial features in those key frames achieves a stabilization of the automatic tracking (described later), and these key frames assures stable and continuous tracking. Next, the program calibrates according to several examples of mouth shapes, later to be used for mouth tracking. Finally, the range of the mouth parameters (minimum and maximum values) for the specific actor are estimated using all the values of the model parameters fitted to all key frames.

Step 3: The next stage is the automatic tracking of the actor's face throughout the entire movie: This is performed from one frame to its successive frame, using the face model, in two steps: first, the two-dimensional face of the actor is mapped onto the three-dimensional face model using a texture-mapping technique. The model can now be altered by changing its parameters only, creating new, synthetic images, which are otherwise very similar to the original movie frames: everything remains unchanged except for different face location, its orientation, and its expressions. By using a minimization algorithm, either analytic or numerical (such as steepest descent algorithm), the program now computes those parameters which maximize the correlation function between the face area of the actor in the next frame and the synthesized projection of the texture-mapped face model. The steepest descent algorithm increases or decreases parameters in the direction that increases the correlation function. It can either work for each parameter separately (until it maximizes the correlation), or it can modify all the parameters at once.

Step 4: After the model is locked on the head of the actor in the next frame, the mouth has to be tracked. This is done by first, checking the parameters of all of the mouths in the key frames and in several previous frames already tracked. Then, the frame that gives the higher correlation is chosen as a first guess for the tracking. Next, the same minimization algorithm used to track the global head motion is used, until the correlation function has maximized. The parameters describing the face model in the tracked frame are written into a file for later use.

Step 5: Steps 3 and 4 are repeated until the entire movie is processed. For best results, instead of executing this process serially from the first frame to the last, the key frames can be used as initial points of tracking. Every two consecutive key frames are used to track from each of them to the frames between them. That way, stabilization of the tracking is preserved.

Step 6: The tracking described above is applied to the dubber movie as well.

II. New Movie Generation Phase

This phase combines the tracking results of both the original and the dubber's movies, in order to synthesize the new audio visually dubbed movie. This audio visually dubbed movie, as explained above, is mostly formed out of the original movie, except for the face of the actor in this audio visually dubbed movie. This face is a texture mapped face on the three-dimensional face model, synthesized, as described above, to fit the lip, mouth, and cheek shapes of the dubber at that particular time. Thus, the parameters of the face model computed as described in phase I, is used to produce the new audio visually dubbed movie, in which for every frame in the original movie, the mouth parameters are modified to those of the dubber. The exact process is as follows:

Step 7: For every frame in the original movie, the face of the actor is texture-mapped on the appropriate face model using the parameters that were calculated in step 3 for the original movie. The mouth parameters of the dubber as calculated in step 3 are used as follows for the new audio visually dubbed movie.

Step 8: Once the desired mouth-shape of the actor is known, the original movie is being searched in the neighborhood of the current frame (approximately 0.1–10 seconds forwards and backwards in time) for a mouth that is most similar in shape or parameters to the new desired mouth. This search for the reference similarity frame takes into account the mouth-shape already chosen for the previous frame in order to make the mouth motion smooth and continuous. From the several (5–10) best fit mouths, the mouth which is picked is from the frame that is closest in time to the previous picked mouth.

Step 9: The mouth chosen in step 8 is texture-mapped into the mouth model using its pre-computed parameters. The face model parameters are then changed to the desired mouth shape, producing a very realistic new frame, which replaces the old frame in the original movie. The user of the program can choose the desired mouth area to be texture—mapped in place—it can be either the inside of the mouth, the whole mouth including the lips or even a bigger area. This procedure creates a synthesized image, in which the face around the mouth, and in particular the lips, are re-shaped according to the sound track, while retaining the familiar face of the original actor. Step 8 can also be skipped, so that the inside of the mouth will be empty. This is useful for making a talking movie from still picture, where the inside information of the mouth is missing; because in the reference frame similarity dictionary of the actor there does not exist any near fit of lip shapes for the target. This black interior can also be filled with visual color/texture.

Step 10: Finally, the sound track from the dubbed movie (target text) replaces the original text and sound.

It is to be noted that an animator using the invented software tool, is free to modify, set, or fix any of the head or mouth parameters, in both the original or audio visually dubbed movie, and even pick a specific mouth to be textured-mapped in place, as described in step 8, all of these at any of the above stages. The tracking program is highly interactive and user-friendly.

The involved software (see Appendix 1) of this invention is very versatile, and can be used in a very wide array of sound/text replacement applications many of which have been mentioned above. The following are examples of some applications of the present invention:

Advertising: For products sold world-wide, an original advertising commercial can be manipulated to produce the same commercial in any desired language. This saves the need to produce a new video for every country or language that the product is aimed for.

Another possibility is to edit a movie, by altering existing scenes without having to re-shoot them again. If, for example, after the movie production was over, the director/editor wishes to alter a specific scene, or change one sentence of a specific actor.

The present invention refers not only to narrated text but also to songs, operas, and music, opening the possibility to change the language of musical video clips.

The production of an animated cartoon is assisted by drawing a line segment for the actor's mouth, drawing a small actor's picture dictionary containing representative reference similarity frames with completely drawn mouths, and then allowing these lip-line segments to be replaced with the corresponding lip shapes of the dubber as are to be found in the actor's picture dictionary.

In general, applications of a method for automatic audio visual dubbing of movie include: cinematic movies, cartoons, documentaries, advertising, news, educational programs, court documentations, speeches, lectures, historical documentation, hearing committees, home videos, sports events, entertainment events, operas, musicals, musical video-clips, simultaneous translation, and adding speech to sequences of either original or added still frames of the aforesaid.

Furthermore, using the library of the previously described reference similarity frames, the present invention allows one to create new movies altogether, and also to convert background narrative to audio visual speech, and to audio-visualize any written text.

The present invention will be further described by FIGS. 1–4. These figures are solely intended to illustrate the preferred embodiment of the invention and are not intended to limit the scope of the invention in any manner. Likewise the attached software (Appendix 1) represents an example of the implementation of the method disclosed in the present patent and is not intended to limit the scope of said method in any way.

FIG. 1 illustrates a block diagram showing the method stages, and its contents is is detailed below.

Figure 2A:
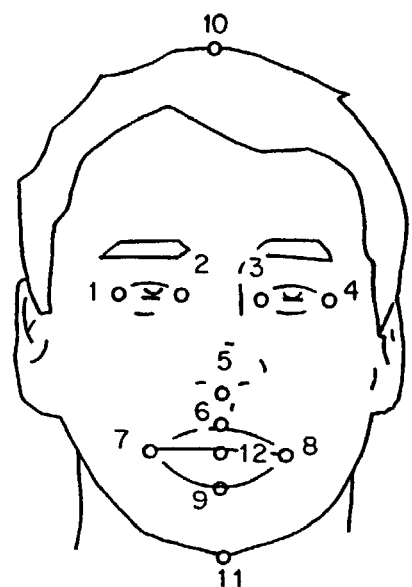
FIGS. 2a and 2b illustrate an example of significant points on a generic frontal picture of a head (FIG. 2a) and a generic side profile picture of a head (FIG. 2b).
Figure 2B:
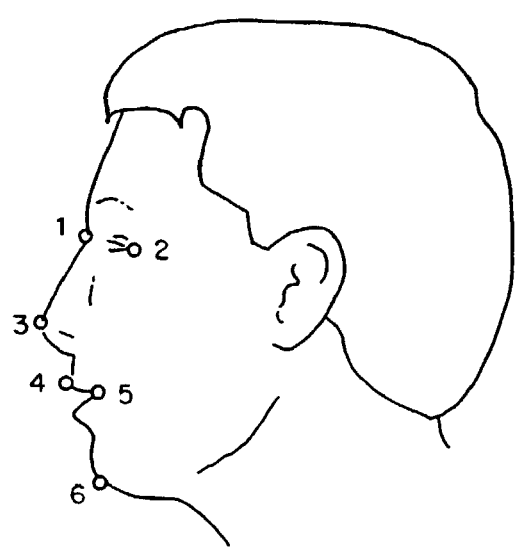

FIGS. 2a and 2b illustrate an example of significant points on a generic frontal picture of a head (FIG. 2a) and a generic side profile picture of a head (FIG. 2b).

Figure 3:
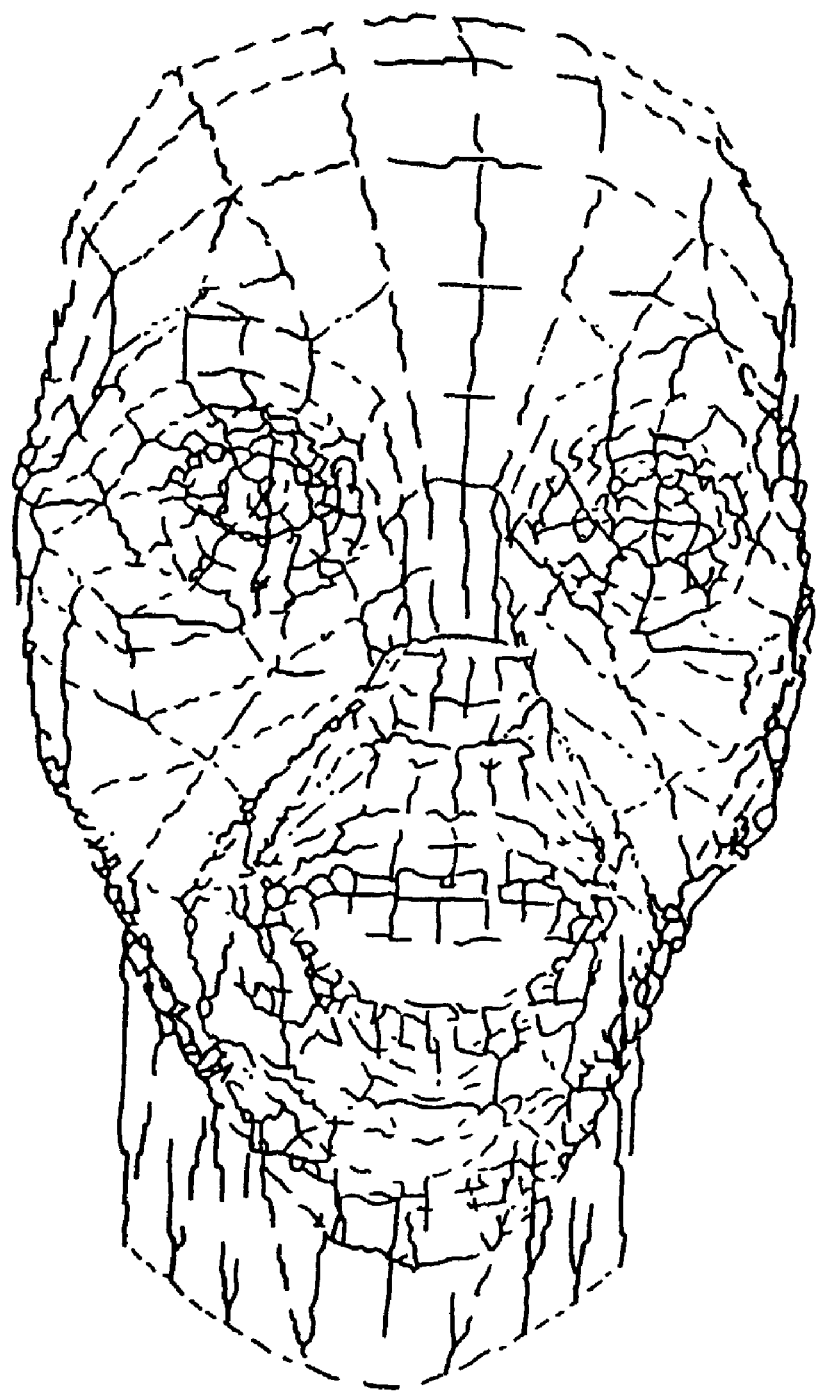
FIG. 3 shows an example of a generic wire frame face model.

FIG. 3 shows an example of a generic wire frame face model.

For illustrative purposes one can take the significant points shown in FIG. 2, measure them on pictures of a real actor, and apply them to a generic wire frame face model (FIG. 3). Fitting a three-dimensional head model to the actor's two-dimensional head picture by adapting the data of the significant points, as measured, results in an integration, as can be seen in FIGS. 4a and 4b.

Figure 4A:
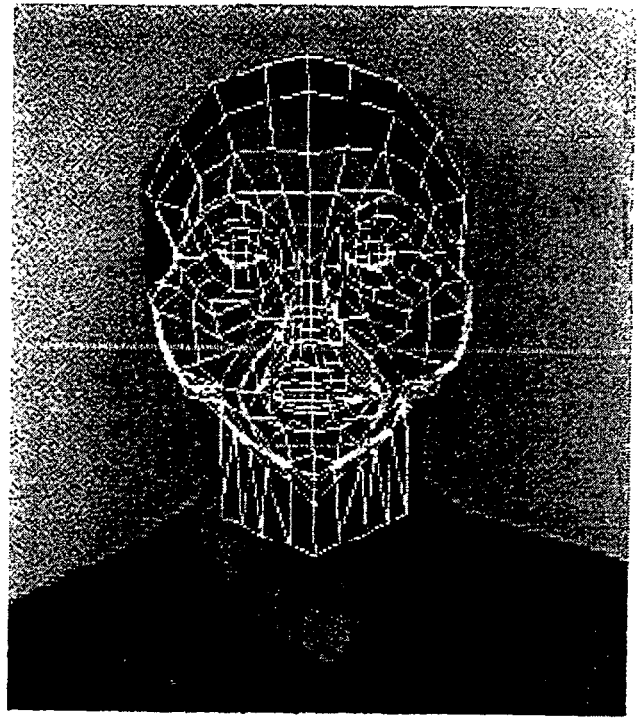
FIG. 4a is an example showing how a customer fitted wire frame model fits onto a frontal view of an actor's face.

FIG. 4a is an example showing how a custom fitted wire frame model fits onto a frontal view of an actor's face.

Figure 4B:
FIG. 4b is an example showing how a custom fitted wire frame model fits onto a profile view of an actor's face.

FIG. 4b is an example showing how a custom fitted wire frame model fits onto a profile view of an actor's face.

FIG. 1 illustrates a block diagram showing the method stages:

In the original movie (1) a frame is selected (2) having a nearly frontal picture of the original actor's head and, if available, a frame is also selected having a picture with his side profile.

A three-dimensional head model is fitted to the actor's two dimensional head picture(s). This model can be controlled by several parameters such as for the position of the head and the status of the mouth. This fitting stage (3) is done by adapting the data of the significant points, as measured in the selected frame, to the model.

The next step (4) is the automated computerized tracking of the fitted three-dimensional head model parameters throughout the movie, from one frame to the next. One partial or complete three-dimensional head model for each frame where the actor appears, is used. Any of the resulting frames can serve as a reference similarity frame for the lips replacement.

A movie of the dubber is taken (5). In this movie the dubber faces the camera in most of the frames. The dubber speaks the target text in this movie.

The same process as applied to the original actor's movie is applied to the dubber's movie: A frame form the dubber's movie is selected (6) having a frontal picture of the dubber's head, and if available, a frame with a picture of his side profile. A three dimensional head model is fitted to the dubber's two dimensional head picture (7) by adapting the data of the significant points, as measured in the selected frame, to the dubber's model. An automated computerized tracking (8) of the said dubber's fitted three dimensional head model parameters is taken throughout the movie, from one frame to the next.

The next stage in this method is to normalize (9) the dubber's minimum and maximum parameters to the actor's minimum and maximum parameters.

In a frame to frame fashion, the original actor's two dimensional face is mapped (10) onto his three dimensional head model. This mapping stage is done by using a texture mapping technique with the reference similarity frames. The result of this stage is one mapped three dimensional partial head model of the original actor for each frame of the original actor in the original movie; wherein the model, corresponding to a given frame may be complete in the case when the original frame contains a frontal view of the actor's face.

In the next stage the textured three dimensional model frames obtained for the original actor are changed (11) by replacing, on a frame to frame basis, the original mouth parameters with mouth parameters as computed for the dubber in the corresponding frames; correspondence being determined by the desired sound track substitution (i.e. the dubbing). Thus is obtained the parametric description for a new picture identical to the original, except that the actor's mouth status resembles the mouth status of the dubber; wherein the new picture corresponds to a frame in the new audio visually dubbed movie.

In order to overcome difficulties like for example those that arise when the dubber in (8) opens a closed mouth in (4), a frame or frames in the original movie are sought whose mouth status is similar to the desired new mouth status. These frames, termed reference similarity frames, are usually but not necessarily in a temporal proximity to the processed frame, and the lips from that frame are copied using texture mapping (12) into the lips area in the new frame. The search for a reference similarity frame is an essential component of the present invention. We therefore repeat its definition: a reference similarity frame is a picture (being a frame in the original movie, a frame in any other movie, or a still photograph) in which the original actor has the desired features of the mouth-shape and head posture suitable for the audio visually dubbed movie.

Alternatively, the reference similarity frame may be taken from a compiled picture library of the original actor or of other actors.

The process (12) is repeated all over again for each frame, until the entire movie is converted.

What is claimed is:

1. A method for automated computerized audio visual dubbing of a movie, comprising:
    (a) fitting a generic three-dimensional actor head model of an actor in a movie to a two dimensional head picture of the actor for at least one frame in said movie, wherein said actor head model is representative of specific facial features of said actor during said frame;
    (b) fitting a generic three-dimensional dubber head model of a dubber making target sounds to a two dimensional head picture of the dubber for said at least one frame in said movie, wherein said dubber head model is representative of specific facial features of said dubber, as said target sounds are made, and
    (c) modifying at least a portion of said specific facial features of said actor head model according to said dubber head model such that said actor appears to be producing said target sounds made by said dubber.

2. A method according to claim 1, further comprising modifying the face of the actor in said frame according to said actor head model as modified so as to obtain a frame wherein at least a portion of the specific facial features of the actor correspond to specific facial features of said dubber and replacing target sounds made by said actor with target sounds made by said dubber.

3. A method according to claim 1, wherein said specific facial features comprises the lips and mouth area.

4. A method according to claim 3, wherein said specific facial features further comprise secondary facial muscles including the cheeks and eyebrows.

5. A method according to claim 1, wherein said at least one frame comprises multiple frames of a movie.

6. A method according to claim 1, wherein said movie is selected from the group consisting of a photographed movie, an animated movie, or any combination thereof.

7. A method according to claim 1, wherein said fittings are accomplished by computer fitting a respective generic three-dimensional head model to a picture of the actor or the dubber using significant facial features of said actor or dubber.

8. A method according to claim 7, further comprising computer tracking specific facial features of said respective three-dimensional head models of said actor and said dubber through a plurality of frames in said movie so as to create a library of reference similarity frames.

9. A method according to claim 8, further comprising mapping, for a plurality of frames in the movie, the face of the actor to the three dimensional head model of said actor wherein said mapping employs a computerized texture mapping technique that uses said reference similarity frames.

10. A method according to claim 9, wherein said modifying comprises replacing, on a frame by frame basis, at least a portion of the specific facial features of the actor head model with those of the dubber head model.

11. A method according to claim 1, wherein the actor is a human, an animal, or any object made to appear to be speaking.

12. A method according to claim 1, wherein the dubber is a human, an animal, or any object made to appear to be speaking.

13. A method according to claim 1, wherein the target sounds comprise at least one spoken word, or at least one sound.

14. A method for automated computerized audio visual dubbing of a movie, comprising:
   (a) providing a three-dimensional graphical model of a head;
   (b) providing a video sequence of a speaker having at least one frame;
   (c) tracking features of said speaker through said video sequence, and extracting changing head parameters of said speaker;
   (d) applying the extracted head parameters to a three-dimensional head model of the speaker;
   (e) applying said changing head parameters from the three-dimensional head model of the speaker to said three-dimensional graphical head model so as to create a speaking three-dimensional head model; and
   (f) generating a video sequence, having at least one frame, of said speaking three-dimensional head model using computer graphic methods.

15. A method according to claim 14, wherein the head parameters comprise the lips and mouth area.

16. A method according to claim 15, wherein the head parameters further comprise secondary facial muscles including the cheeks and the eyebrows.

17. A method according to claim 14 wherein a sound track is added to said video sequence of said three-dimensional head model.

18. A method according to claim 14, wherein the speaker is a human, an animal, or any object made to appear to be speaking.

19. A system for the automated computerized audio visual dubbing of a movie, comprising;
   (a) means for providing a three-dimensional graphical model of a head;
   (b) means for tracking features of a speaker through a video sequence, and for extracting changing head parameters of said speaker through said video sequence;
   (c) means for applying the extracted head parameters to a three-dimensional head model of the speaker;
   (d) means for applying said changing head parameters from the three-dimensional head model of the speaker to said three-dimensional graphical head model so as to create a speaking three-dimensional head model and for generating a video sequence, having at least one frame, of said speaking three-dimensional head model using computer graphic methods; and
   (e) means for adding a sound track to said video sequence of said three dimensional head model.

20. A system for the automated computerized audio visual dubbing of a movie, comprising;
   means for fitting a generic three-dimensional actor head model of an actor in a movie to a two dimensional head picture of the actor for at least one frame in said movie, wherein said actor head model is representative of specific facial features of said actor during said frame;
   means for fitting a generic three-dimensional dubber head model of a dubber making target sounds to a two dimensional head picture of the dubber for said at least one frame in said movie, wherein said dubber head model is representative specific facial features of said dubber, as said target sounds are made, and;
   means for modifying at least a portion of said specific facial features of said actor head model according to said dubber head model such that said actor appears to be producing said target sounds made by said dubber.

21. Method for computerized audio visual dubbing of a movie, the method comprising using mouth parameters of an original actor for locating similar mouth parameters in a library of reference similarity frames and replacing the mouth area of the original actor in at least one frame of a movie by the mouth area of an actor taken from said library.

22. Method according to claim 21 wherein the library of reference similarity frames comprises a compiled picture library of the original actor.

23. Method according to claim 21 wherein the wherein the library of reference similarity frames comprises a compiled picture library of at least one picture of an actor other then the original actor.

24. A method for automated computerized audio visual dubbing of a movie, comprising;
   (a) providing a three-dimensional head model of an actor in a movie for at least one frame in said movie, wherein said actor head model is representative of specific facial features of said actor during said frame;
   (b) providing a three-dimensional head model of a dubber making target sounds for said at least one frame in said movie, wherein said dubber head model is representative of specific facial features of said dubber, as said target sounds are made; and
   (c) modifying at least a portion of said specific facial features of said actor head model according to said dubber head model such that said actor appears to be producing said target sounds made by said dubber.

25. A computer-readable media containing instructions for controlling a computer system to implement the method of claim 1.

26. A computer-readable media containing instructions for controlling a computer system to implement the method of claim 14.

27. A computer-readable media containing instructions for controlling a computer system to implement the method of claim 21.

28. A computer-readable media containing instructions for controlling a computer system to implement the method of claim 24.

* * * * *